Oct. 13, 1959     R. T. PREMOSHIS     2,908,743
ELECTRICAL OUTLET
Filed Nov. 30, 1956

INVENTOR:
ROBERT T. PREMOSHIS
BY:
Green, McCallister and Miller
HIS ATTORNEYS.

United States Patent Office 2,908,743
Patented Oct. 13, 1959

2,908,743
ELECTRICAL OUTLET
Robert T. Premoshis, Fayette City, Pa.
Application November 30, 1956, Serial No. 625,417
3 Claims. (Cl. 174—53)

This invention relates to electrical outlet boxes and to assemblies employed therewith that may include an electric unit such as a control or outlet unit. A phase of the invention deals with means for adapting a standard outlet or terminal box, standard face plate, and switch unit means to a quick mounting and dismounting type of assembly.

The problem of properly cleaning, assembling, connecting and disconnecting wires or leads of electric wiring to terminal points is one to which the householder may be frequently subjected. There is danger from the standpoint of electric shock during the work, and of fire due to a poor or incorrect assembly. Also, electrical connections may be poor with the need for dis-assembling and soldering.

It is recognized that other have considered the possibility of employing so-called plug-in arrangements for electrical parts including switch parts. But the constructions which I have encountered require special forms of outlet boxes, switch units, etc., and are too complicated or expensive. It is to the advantage of manufacturers to continue to produce units of standard construction, and regardless of whether or not those units are to be used in a conventional manner by connecting wiring directly through the outlet box to terminal set screws on the base or sides of a switch or other element.

In analyzing why so-called plug-in types have not been in use in the art, I find that all of them have had certain disadvantages which have precluded their adoption. And, as I see it, a common limitation has been their lack of adaptability to standard parts or equipment. The problem has thus been one of devising a relatively simple but practical assembly and one which will always provide a fool-proof electrical connection between plug-in portions.

It has thus been an object of my invention to provide a more practical and usable type of adaptor means for an electric outlet or terminal box assembly;

Another object of my invention has been to devise a simple construction for use as a secondary or intermediate unit between more or less standard units or parts of an electric outlet or terminal box assembly;

A further object of my invention has been to devise a solution to the problem of adapting standard outlet or terminal box and control or outlet units to a quick assembly and dis-assembly or to a push-in and pull-out type of mounting;

These and other objects of my invention will appear to those skilled in the art from the illustrated and described embodiment.

In the drawings, Figure 1 is an exploded side section in elevation through an assembly employing features of my invention; the figure illustrates how a secondary unit of my invention may be permanently or securely connected to the terminals of a cable, line or an electric wiring, and how such secondary unit may be employed with a control (switch) unit to provide a quick assembly and diassembly of the control unit with respect to other, non-wearing, or more permanent parts of the construction;

Figure 1:
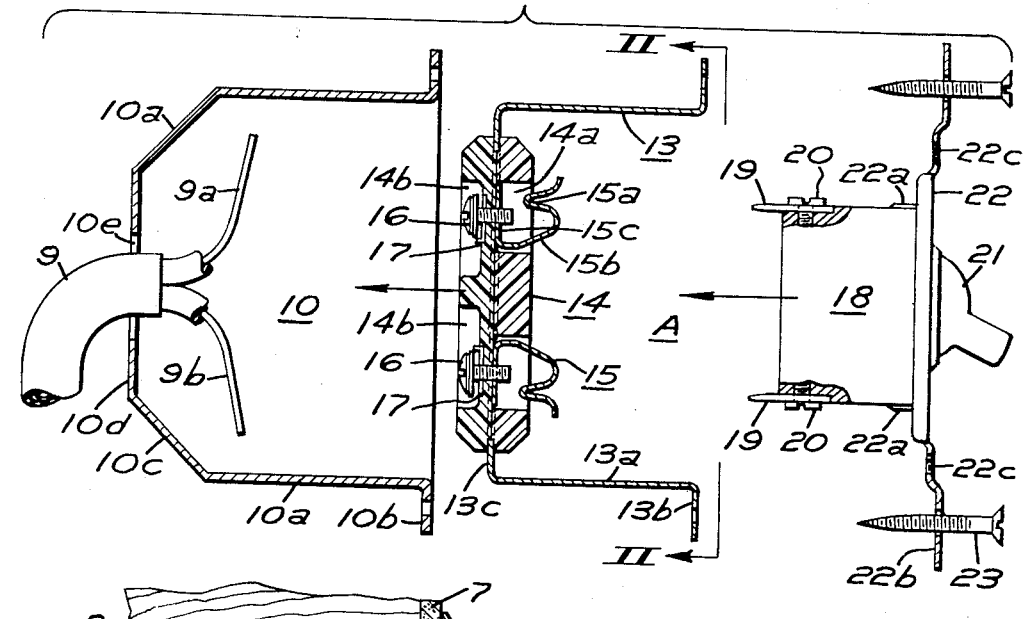

In carrying out my invention, I employ a fit-in type of secondary unit A (see Figure 1) which is adapted to be secured in position by the same screw assembly as an outlet box 10, and to be supported in a suspended relationship within and as an adaptor for the outlet box. The suspension is effected in such a manner that a terminal assembly board, base or block 14 serves on its bottom or under-side to permanently or semi-permanently connect terminal wires or leads 9a and 9b of an electric cable, cord or wiring 9. This makes possible the use of a soldered joint, since it is no longer necessary to provide for disconnecting the wire leads, themselves, from a control or switch unit such as 18. If the assembly is to be used as a switch or turn-off and turn-on control unit, then terminal or lead 9a may represent a live wire of a suitable source of electricity, and 9b may represent a dead or return wire to the electrical unit that is to be energized. On the other hand, if an assembly of my invention is to be employed with an electric outlet such as a socket, then both lines 9a and 9b will be "live" wires, and instead of the plug-in switch 18, I will provide a plug-in socket or a plug-in connector, as may be needed.

In accordance with my invention, one side of an insulative or dielectric block, base terminal member or board 14 serves at least as a semi-permanent under-mounting for wires of the electrical system, while the other side serves as a mounting for wiping-joint spring clips or contacts 15. I have shown a switch unit of conventional construction 18 having a toggle or snap portion 21. As disclosed particularly in Figures 1 and 3, a front mounting piece or metal strap member 22 is clamped on opposite ends (top and bottom sides) of the body of the switch by spring fingers 22a which fit over mount portions of the switch 18.

Figures 2, 3:
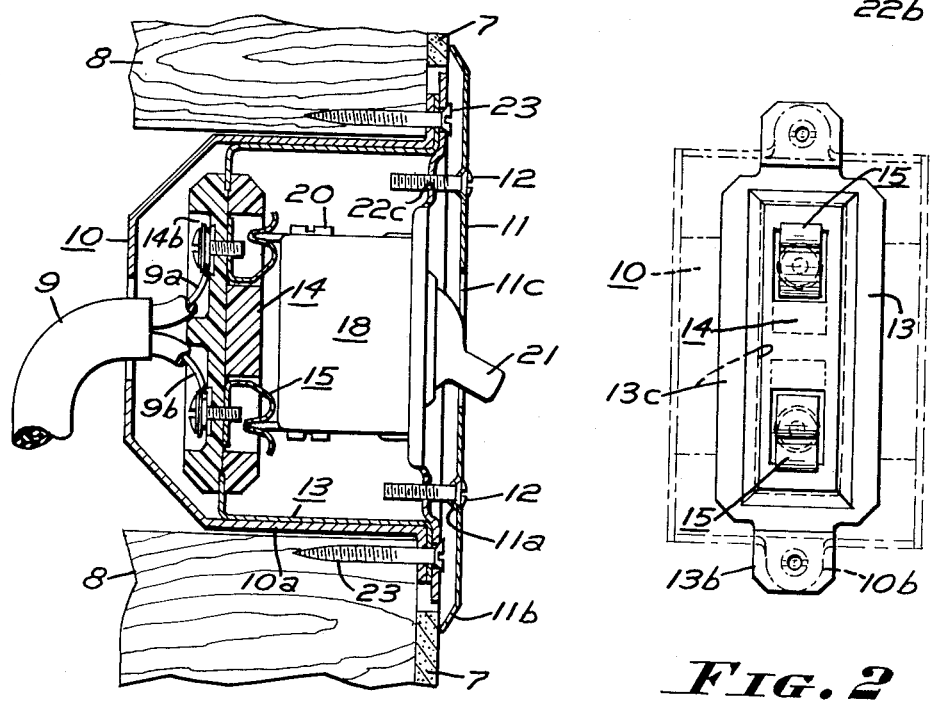
Figure 2 is an end view on the scale of and taken along the line II—II of Figure 1.
Figure 3 is a side section in elevation through an assembly of my invention and illustrating how it may be mounted in position within a wall or between framing members of a building construction; this figure is on the same scale as Figures 1 and 2.

The front mounting piece or member 22 has screw-receiving or bypassing outer tab end portions 22b, and also has inner threaded holes 22c to receive finish set screws 12 and mount a face plate 11 in position, as shown in Figure 3.

The switch 18 has, as shown, screw terminals 20 which normally receive or screw-down upon wire ends or leads, such as 9a and 9b; in such a manner, the wiring is normally directly electrically connected to a control or outlet unit such as the switch 18. As now employed, I provide the control means such as switch 18 with a pair of backwardly-projecting, tapered-end, flat metal or knife-like plug portions or male elements 19. Each element 19 is secured in position by one of the set screws 20 to take the place of the electric wire bare ends or leads 9a and 9b. As a result, to assemble the units such as shown in Figures 1 and 3, it is only necessary to remove finish set screws 12 and face plate 11, and to then pull-out the old and push-in a new unit 18. The plug portions 19 are push-in moved and wiped into an effective electrically connected relation with respect to spring clip, clamping portions, spring-like wiping joints, or hollow spring sockets 15a of flexible strap metal pieces 15. The sockets 15a have, as shown, opposed, sloped, fold portions whose faces are smooth to, with the wedge shape of the opening defined therebetween, provide an effective wiping type of major face electrical contact.

The pieces 15 may be of a suitable metal such as aluminum, brass or bronze and, at their inner ends, are provided with a threaded hole, in order that they may be mounted in place by set screws 16. Each piece 15 projects outwardly from supporting, outwardly-open apertures 14a in the insulated base or terminal member 14. The piece 15 has a bent-over spring shoulder portion 15b that connects with the clip or clamping portions 15a to give it a spring-like resiliency and assure a wiping type of joint connection with respect to transverse or major face sides of the plug-in or male parts 19.

The under-side of the terminal block 14 is inwardly-offset or cut-out at 14b to receive the set screws 16 and a metal clamp washer 17, so that (as shown in Figure 3) the wire terminals 9a and 9b may be secured and desirably soldered in place to provide a permanent type of joint.

Outlet box 10 is of standard or conventional construction. It is of cup-like shape and has major rectangular side wall portions 10a and a pair of outwardly-projecting wall mounting tab portions 10b. Each tab portion 10b is provided with a hole for bypassing or receiving a wall-mounting wood screw 23. The side wall portions 10a terminate in inclined portions 10c and a back end portion 10d. The portions 10c and 10d may have the usual knock-out discs to provide suitable inlet holes, such as 10e, to bypass the electric cable 9.

The secondary part or unit A of my invention, in addition to the central terminal base 14, comprises a somewhat spring-like U-shaped support frame or spider part 13 of strap metal construction. The frame part 13 (as shown particularly in Figure 2) has a mid-connecting, base or cross-over-connecting portion 13c of a somewhat flat, banding, somewhat rectangular, or hollow-center-oblong shape. The portion 13c is supported by and connected to a pair of backwardly or inwardly projecting side leg portions 13a. Each leg portion 13a terminates in a wall-mounting tab portion 13b that is also drilled out or provided with a hole to register with aligned holes in the tabs 10b of the outlet box 10 to receive and bypass suitable common mounting means, such as wood screws 23.

Figure 3 illustrates how the parts 10, A, and 18 are mounted in an assembled relationship between wall frame members or over a wall finish portion 7. In this connection, the wood screws 23 are employed to simultaneously position tab portions 10b of the standard outlet box 10 as well as tab portions 13b of my secondary unit A. My secondary unit is strongly held in position by reason of its shape and also by reason of the fact that its legs 23 closely abut against, within, and along opposite sides of the wall portions 10a of the outlet box. The control means or switch unit 18 is also held in position in a conventional manner at its end tabs 22b to, in turn, hold a finish or face plate member 11. It may be noted that the face plate 11 has inwardly-offset portions 11a to guide and inset heads of mounting or finish screws 12 and has an open window or front portion 11c for switch arm 21. A beveled finish edge 11b provides the plate 11 with a spring-like action and a better appearance effect, and also simultaneously provides a sufficiently offset spacing for heads of the mounting screws 23.

I found that it is a highly difficult problem to both provide a strong and simple mounting base or terminal block which would support the wire cable 9 and, at the same time, support an inner end portion of the control means or unit 18. I found that the problem could be best met by providing a somewhat flexible type of mounting by means of the spring leg portions 13a, and by employing a banding, enclosing ring, or loop-like type of connecting base portion 13c. That is, the base portion 13c is hollow or has a central opening to receive sandwich parts of the mounting block 14. That is, I contemplate making the unit 14 of plastic material and molding or casting it in-place or sandwiching two pieces of it along inner bounding portions of the cross-over or connecting portion 13c.

It is thus apparent that in accordance with my invention, the parts 10 and 18 may be of standard construction. The secondary part A may be mounted in position by moving it in the direction of the arrows of Figure 1.

This movement, however, is not accomplished until after bare ends of the wires 9a and 9b have been secured to set screws or terminals 16. At this time, the block 13 and the unit A may be at least semi-permanently mounted in position within the outlet box 10. The unit 18, whether it is a switch unit or an outlet unit, may be replaced from time to time as it wears out without disturbing electrical connections, without involving any particular skill, except that of screwing and unscrewing finish mounting screws 12 and wall mounting screws 23.

In speaking of a building wall, I of course include a side wall, a floor, a ceiling or any part that may serve as a mounting on or within which the assembly of my construction may be secured.

What I claim is:

1. An improved quickly assembled and disassembled electrical outlet construction for the electric wiring of a building which is to be mounted within a cavity behind an exposed surface of the building, an outlet box of standard shape and construction to be positioned within the cavity and having a forwardly-open mouth portion defined by a pair of screw-receiving out-turned mounting tabs to lie against the exposed surface, an electric unit having a pair of backwardly-projecting electric prong contacts, said electric unit being provided with screw-receiving out-turned wall mounting tabs to align with the mounting tabs of said outlet box, an intermediate support part of U-shaped construction having opposed leg portions in a transversely-spaced relationship with each other and mounted in supported abutment with and along opposed sides of the outlet box for slide-in and out movement with respect thereto, said leg portions terminating in screw-receiving out-turned mounting tabs to abut between the mounting tabs of the outlet box and electric unit in screw-receiving alignment therewith; screw means projecting through the mounting tabs of the outlet box, electric unit and intermediate part to simultaneously hold them in an assembled and mounted relation with respect to each other and the building; said intermediate part having a cross-connecting portion supported by inner end portions of said pair of legs, a terminal portion carried by said cross-connecting portion, said terminal portion having back-positioned electrical terminals thereon for at least a semi-permanent connection to the electric wiring and having front-positioned spring-like electrical contacts connected to said terminals and projecting forwardly therefrom to slidably-receive said prong contacts of the electric unit and connect them to the wiring.

2. An electric outlet construction as defined in claim 1 wherein; the tab, leg and cross-connecting portions of said intermediate part are of strap metal construction, said cross-connecting portion has a central opening enclosed by a continuous metal band, and said terminal portion is of dielectric material and projects across and closes-off the central opening and is secured in an overlapping relationship over inner edges of and along said continuous metal band.

3. An electric outlet construction as defined in claim 2 wherein, a standard face plate is provided having screw mounting holes in a standard spaced-apart relationship with respect to each other, the mounting tabs of said electric unit having threaded screw-receiving holes inwardly spaced with respect to their end portions, and finish mounting screws are positioned to extend through the screw holes in said mounting plate to engage within the threaded screw mounting holes of said electric unit to mount the said plate over and close-off the construction.

References Cited in the file of this patent

UNITED STATES PATENTS

| | | |
|---|---|---|
| 1,938,309 | Williams | Dec. 5, 1933 |
| 2,397,688 | Osinski | Apr. 2, 1946 |
| 2,433,917 | McCartney | Jan. 6, 1948 |
| 2,531,350 | Chrastina | Nov. 21, 1950 |
| 2,828,394 | Mayzik | Mar. 25, 1958 |